US010990337B1

(12) United States Patent
Inouye

(10) Patent No.: US 10,990,337 B1
(45) Date of Patent: Apr. 27, 2021

(54) PRINT SERVER PROVIDING PRINT-READY JOBS TO PRINTERS IN ANTICIPATION OF USER PRINTER SELECTION

(71) Applicant: Xerox Corporation, Norwalk, CT (US)

(72) Inventor: Steven H. Inouye, Cypress, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/707,009

(22) Filed: Dec. 9, 2019

(51) Int. Cl.
*G06F 3/12* (2006.01)

(52) U.S. Cl.
CPC ............ *G06F 3/126* (2013.01); *G06F 3/1208* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 6,026,375 A | 2/2000 | Hall et al. | |
| 6,552,813 B2 | 4/2003 | Yacoub | |
| 7,880,912 B2 | 2/2011 | Eldridge | |
| 8,346,903 B2 | 1/2013 | Shepherd | |
| 8,422,053 B2 | 4/2013 | Knodt | |
| 8,514,433 B2 | 8/2013 | Merriam | |
| 8,947,696 B1 | 2/2015 | Uyttendaele | |
| 9,448,749 B1 | 9/2016 | Lee et al. | |
| 9,690,525 B2 | 6/2017 | Nathani et al. | |
| 9,826,121 B2 | 11/2017 | Zehler et al. | |
| 10,007,470 B2 | 6/2018 | Ozawa et al. | |
| 2006/0044598 A1 | 3/2006 | Etelapera | |
| 2006/0238799 A1 | 10/2006 | Kidokoro | |
| 2014/0049797 A1* | 2/2014 | Huster | G06F 3/122 358/1.15 |

* cited by examiner

*Primary Examiner* — Lennin R RodriguezGonzalez
(74) *Attorney, Agent, or Firm* — Gibb & Riley, LLC

(57) ABSTRACT

In systems and methods, a print server receives an original print job in an originated format that is associated with a user through a network. The print server identifies potentially used printers that can be utilized to print the original print job based on a current physical location of a mobile wireless device associated with the user. The print server converts the original print job from the originated format into printing formats used by the potentially used printers to generate print-ready print jobs. The print server is adapted to send the print-ready print jobs to the potentially used printers through the network when the print-ready print jobs are created. A selected printer of the potentially used printers receives an instruction to print the original print job and the selected printer prints a received one of the print-ready print jobs when the selected printer receives the instruction to print.

20 Claims, 4 Drawing Sheets

PRINT SERVER PROVIDING PRINT-READY JOBS TO PRINTERS IN ANTICIPATION OF USER PRINTER SELECTION

BACKGROUND

Systems and methods herein generally relate to remote printing and to print servers providing print-ready jobs to printers.

Traditionally, printers were physically connected to computerized devices using dedicated printer cables, which required the user to directly man the computer and printer when performing printing operations. More advanced systems utilize print queues that allow a user to upload print jobs from their computer to a print server and utilize a printer that is not directly connected to their computer through a cable, so long as the printer has access to the print server and can download the print job.

Mobile printing takes these concepts a step further and allows the print server to be a virtual machine within a cloud or computer network. This potentially allows the user or another individual to upload an original print job (by email, through websites, etc.) to the print server from any device at any geographic location, including their computer, their mobile wireless device, etc. The user is often supplied an access code that must be provided to the printer in order for the printer to perform the printing, and this access code secures the print job from unauthorized access. With this, no matter where the user finds themselves, so long as they can locate a printer that has a connection to the print server, they can retrieve and print the print job.

More specifically, when performing this type of mobile printing, the user instructs a network-connected printer (either using the printer interface or controlling the printer through an app on their mobile wireless device) to print a previously uploaded print job. In response, the printer makes a request to the print server to generate a print-ready file that the printer can use to print the print job. Note that because different printers operate under different protocols, each different brand or type of printer may require a different print-ready file to print the same original print job. It can take some time for the print server to prepare the print-ready file and for the print-ready file to be downloaded to the printer, and these delays can lead to user dissatisfaction.

SUMMARY

Various systems herein include, among other components, a print server connected to a network. The print server has a processor and an input/output device, electronic storage, etc., in communication with the processor. The print server is adapted to supply an application to a mobile wireless device through the network. The application is adapted to associate a user with the application. The application is also adapted to determine and provide a current physical location of the mobile wireless device to the print server through the network. There are multiple printing devices at different physical (e.g., geographic) locations that are in communication with the print server through the network.

The print server is adapted to receive an original print job that is associated with the user in an originated format through the network. In response to receiving the original print job, the print server is adapted to identify potentially used printers (from among the multiple printing devices) that can be utilized to print the original print job based on the current physical location of the mobile wireless device and based on the different physical locations of the multiple printing devices. The print server can also be adapted to identify the potentially used printers further based on historical printer selections performed by the user.

In further response to receiving the original print job, the print server is adapted to convert the original print job from the originated format into printing formats used by the potentially used printers so as to generate multiple print-ready print jobs, each corresponding to one of the potentially used printers. The potentially used printers are only able to print using files in the printing formats and are not able to print using files in the originated format. The print server is also adapted to send these print-ready print jobs to the potentially used printers (e.g., all the potentially used printers) through the network immediately when the print-ready print jobs are created.

At some time after the potentially used printers have received their print-ready print jobs, a selected printer (which can be any one of the multiple printing devices) is adapted to receive an instruction to print the original print job. Note that the print server is adapted to send the print-ready print jobs to the potentially used printers through the network before the selected printer receives the instruction to print the original print job. Also, in some implementations, the application is adapted to send the instruction to the selected printer to print the original print job based on user input to the application indicating the selected printer is to print the original print job. Based on the selected printer being one of the potentially used printers and in response to the instruction to print the original print job, the selected printer prints a received one of the print-ready print jobs.

In contrast, based on the selected printer not being one of the potentially used printers, a number of processes take place. Specifically, in response to the instruction to print the original print job, if the selected printer is not one of the potentially used printers and, therefore, has not previously received a print-ready print job from the print server, the selected printer is adapted to send a request to the print server through the network to convert the original print job into a selected-printer specific print-ready print job. The selected-printer specific print-ready print job has one of the printing formats. In response to this request to convert the original print job, the print server is adapted to convert the original print job into the selected-printer specific print-ready print job. Then, the print server is adapted to send the selected-printer specific print-ready print job to the selected printer through the network. In response to the selected-printer specific print-ready print job being received from the print server the selected printer is adapted to print the selected-printer specific print-ready print job.

Various methods use the systems described above and supply an application from the print server to the mobile wireless device through the network. Also, these methods associate (using the application) a user with the application. Further, methods herein determine (using the application) the current physical location of the mobile wireless device. Again, multiple printing devices are at different physical locations and are in communication with the print server through the network. These methods provide (using the application through the network) the current physical location of the mobile wireless device to the print server.

Methods herein receive (using the print server through the network) an original print job that is associated with the user in an originated format. These methods then identify (using the print server) potentially used printers of the multiple printing devices that can be utilized to print the original print job based on the current physical location of the mobile wireless device and the different physical locations of the multiple printing devices. The identifying of the potentially used printers can be further based on historical printer selections performed by the user.

Such methods convert (using the print server) the original print job from the originated format into printing formats used by the potentially used printers to generate print-ready print jobs, each corresponding to one of the potentially used printers. The potentially used printers are only able to print using files in the printing formats and are not able to print using files in the originated format. These methods send (using the print server through the network) the print-ready print jobs to (all of) the potentially used printers when the print-ready print jobs are created.

At some point after the print server sends the print-ready print jobs to the potentially used printers, these methods receive (using a selected printer of the multiple printing devices) an instruction to print the original print job. In other words, the sending of the print-ready print jobs to the potentially used printers is performed before the instruction to print the original print job is received by the selected printer. The application can be adapted to send the instruction to the selected printer to print the original print job based on user input to the application indicating the selected printer is to print the original print job. Based on the selected printer being one of the potentially used printers, these methods simply print (using the selected printer) a received one of the print-ready print jobs when the selected printer receives the instruction to print the original print job.

However, based on the selected printer not being one of the potentially used printers, these methods send (using the selected printer through the network) a request to the print server to convert the original print job into a selected-printer specific print-ready print job. In response the methods herein convert (using the print server) the original print job into the selected-printer specific print-ready print job. Such methods send (using the print server through the network) the selected-printer specific print-ready print job to the selected printer. In response, these methods print (using the selected printer) the selected-printer specific print-ready print job when the selected-printer specific print-ready print job is received from the print server.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, it can take some time for the print server to prepare the print-ready file and for the print-ready file to be downloaded to the printer, and these delays can lead to user dissatisfaction. Indeed, the first print out time (FPOT) for mobile print jobs in a secure print/follow print environment tends to be longer than print jobs submitted directly to the device from a user's desktop because the network communications between the cloud and the printer tend to be slower than the user's local area network. Additionally, the conversion of a document from the native format of document creation (e.g., word processor formats, spreadsheet formats, presentation formats) to a print-ready format (e.g., Postscript, PCL) is done at job release time rather than at job submission time, which adds to the undesirable delay.

In view of these issues, the systems and methods herein improve first print out time of released mobile print jobs by anticipating which device the user will select for printing and performing the conversion and spooling of the print-ready job prior to the user's arrival at the printer. This is especially important because the user is more sensitive to the wait time when they are physically present at the printer and have performed all steps needed for printing to commence. The systems and methods herein address this issue and reduce/eliminate the wait time by anticipating which printer the user is likely to use, based on the location of the user at job submission time.

In the vast majority of cases, users submit print jobs knowing ahead of time that a suitable printer is nearby. Rather than wait for the user to explicitly release the job for printing, with systems and methods herein the cloud server converts the document into print-ready format at document submission time based on printers that are in close proximity to the user's location. If more than one printer is close by, the cloud server produces multiple print-ready files, each being specific to one of the potentially used printers. Print options such as plex, color and number of copies are handled using a job ticket that is attached to the job. Assuming the printer has local disk storage, the job is pre-spooled to the each potentially used printer in order to avoid potentially slow network transfer speeds from the cloud to the device. Therefore, with the systems and methods herein, the job immediately starts printing as soon as the user enters the access code and releases the job.

Figure 1:
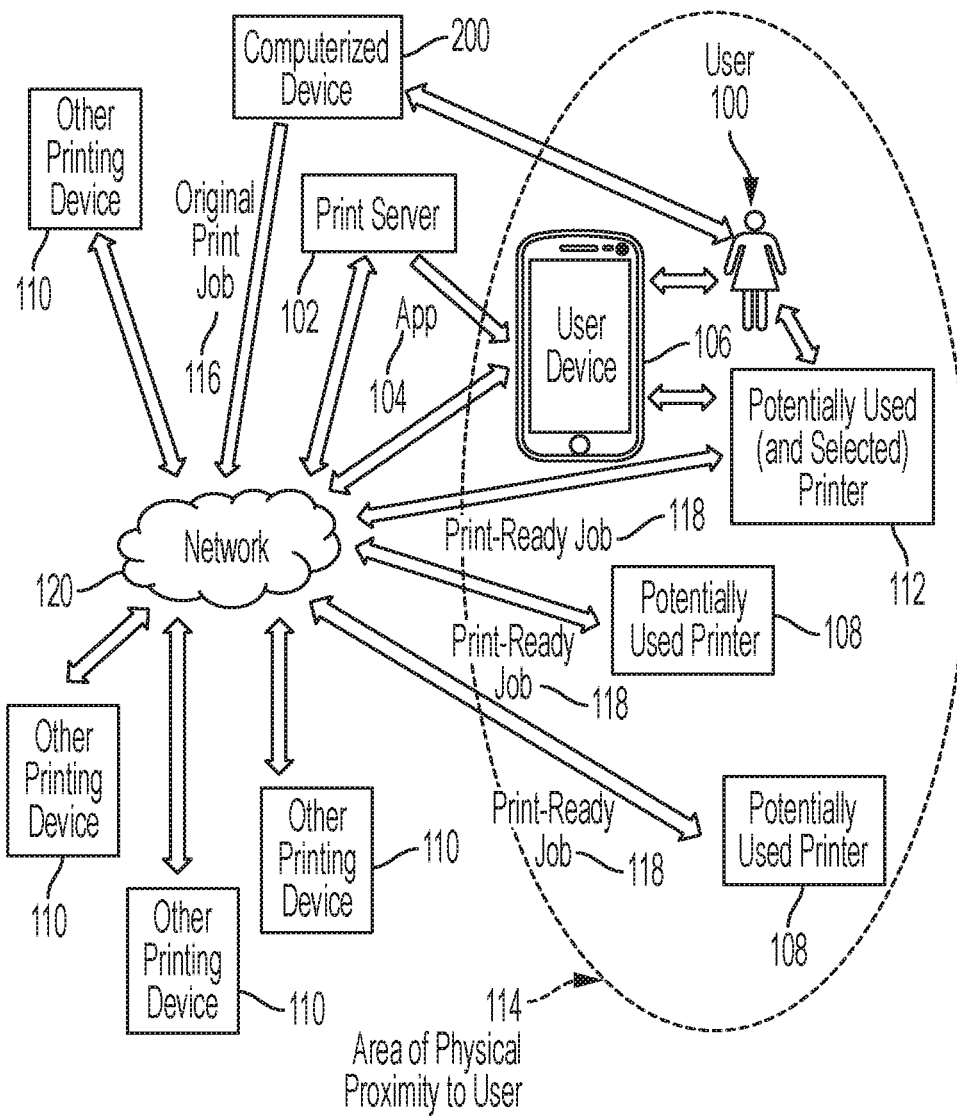
FIG. 1 is a schematic diagram illustrating systems herein.

Referring now to the drawings, as shown for example in FIG. 1, various systems herein include among other components a print server 102 connected to a network 120. Additionally, various computerized devices 102, 200, mobile wireless devices (user device) 106, etc., can be wirelessly or wire-connected to the network 120. FIG. 1 also illustrates multiple printing devices 108, 110, 112 at different physical (e.g., geographic) locations that are in communication with the print server 102 through the network 120.

The print server 102 is adapted to supply an application or mobile app 104 to the mobile wireless device 106, directly or through the network 120. The application 104 is adapted to associate a user 100 with the application 104. For example, the application 104 can request that the user 100 input various information (e.g., into various input screens) identifying printing accounts or print queues that the user 100 will utilize for mobile printing as well as other information identifying the user.

The application 104 is also adapted to determine and provide a current physical location of the mobile wireless device 106 to the print server 102 through the network 120. For example, the mobile wireless device 106 may including positioning sensors (such as global positioning systems (GPS)-based location identification devices and/or other features) and supply the current position of the mobile wireless device 106 (and presumably of the user 100) to the application 104, which provides the same information to the print server 102.

The print server 102 is further adapted to receive an original print job 116 that is associated with the user 100 in an originated (e.g., non-RIPped) format through the network 120. The original print job 116 can be uploaded by the user 100, or by a different user, and during the upload process the user 100 or the appropriate user account is identified, to link or associate the original print job 116 to the user 100.

In response to receiving the original print job 116, the print server 102 anticipates which printers the user 100 is likely to use to print the original print job 116. Initially, the multiple printing devices 108, 110, 112 under consideration all must be screened for being physically capable of printing the original print job 116 (e.g., the printer must be properly functioning, have sufficient printing supplies, have components that allow it to physically print according to the print job requirements, etc.).

Specifically, the print server 102 is adapted to identify potentially used printers 108, 112 (from among the multiple printing devices 108, 110, 112 screened as being capable) that can be utilized to print the original print job 116 based on the current physical location of the mobile wireless device 106 and based on the different physical locations of the multiple printing devices 108, 110, 112. One example of the processing that can be used to identify the potentially used printers 108, 112 is shown in FIG. 1 where the printers within the area of physical proximity to the user 114 are identified as the potentially use printers 108, 112. Other location-based selection criteria can be utilized to identify the potentially used printers 108, 112 including: the anticipated travel path of the user (e.g., based on current location and next calendared location (as tracked by the application), etc.); the historical locations the user regularly visits at certain days/times (as tracked by the application); the size of the area of physical proximity to the user 114 can expand or contract based on how much travel the user historically performs (as tracked by the application); etc.

The print server 102 can also be adapted to identify the potentially used printers 108 further based on historical printer selections performed by the user 100. In one example, the application 104 can maintain information of which printers the user 100 has used, and can determine which printers are the most frequently used, which printers are never used, etc. For example, even if a printer is outside the area of physical proximity to the user 114, it may be added to the list of potentially used printers 108, 112 if it is a very frequently used printer (e.g., a printer that is selected above 40%, above 50%, above 75%, etc., of the time when the user makes a printer selection). Similarly, if a user 114 never uses (or very infrequently uses) a specific printer, that printer may be removed from the list of potentially used printers 108, 112 even if that printer is within the area of physical proximity to the user 114.

In further response to receiving the original print job 116, and once the potentially used printers 108, 112 have been identified, the print server 102 is adapted to convert the original print job 116 from the originated format into all the potentially different printing formats used by the various potentially used printers 108, 112 so as to generate multiple print-ready print jobs 118, each having a format corresponding to one of the potentially used printers 108, 112. Raster image processing (RIPping) is usually performed in order to create print-ready files, and such can be performed by a specialized processor, if desired.

The potentially used printers 108, 112 are only able to print using files in specific printing formats (RIPped formats, e.g., Postscript, PCL) and are not able to print using files in the originated format (non-RIPped formats, e.g., word processor formats, spreadsheet formats, presentation formats). The print server 102 is also adapted to send these print-ready print jobs 118 to the potentially used printers 108 (e.g., all the potentially used printers 108) through the network 120 immediately when (as soon as) the print-ready print jobs 118 are created. In some implementations herein once the print-ready jobs 118 have been downloaded to the potentially used printers 108, the print server 102 could cause the application 104 to display a message to the user 114 on the user interface of the mobile wireless device 106 listing the potentially used printers 108 to which the print-ready print jobs 118 have been downloaded (e.g., "the closest nearby printers are . . . ").

When convenient for the user 100, the user 100 will instruct one of the printers 108, 110, 112 to print the previously uploaded original print job 116. For example, the user 100 may walk up to one of the printers (selected printer 112) and indicate through manipulation of various features of the printer's user interface that the original print job 116 is to be printed (which may require the user 100 to provide access codes, user login information, etc.).

In some implementations, the application 104 may be adapted to wirelessly send an instruction to the selected printer 112 to print the original print job 116 based on the user 100 providing input to the application 104 indicating that the selected printer 112 is to print the original print job 116. Therefore, at some time after the potentially used printers 108 have received their print-ready print jobs 118, the selected printer 112 (which can be any one of the capability-screened multiple printing devices 108, 110, 112) is adapted to receive an instruction to print the original print job 116 from the user 100.

Note that the print server 102 is adapted to create and send the print-ready print jobs 118 to the potentially used printers 108 through the network 120 before the selected printer 112 receives this instruction to print the original print job 116 and without seeking approval from the user 100. Therefore, the identification of the potentially used printers 108, the creation and transmission of the print-ready jobs 118, the storage of the print-ready jobs within the potentially used printers 108, 112, etc., is all performed automatically behind the scenes in a transparent manner to the user 100 (e.g., without requesting information from the user and without providing any notification to the user) as soon as the original print job 116 is uploaded to the print server 102. This allows the print ready jobs 118 to be stored and waiting at many different printers 108, 112 simultaneously to allow immediate printing of the print ready job 118 if the user 100 were to decide to utilize any of the potentially used printers 108, 112 (which greatly increases user satisfaction). This processing intentionally places a greater value on avoiding delay of pre-printing processing at the printing device, and a lesser value on consumption processing resources of the print server 102, network 120 resources, and printing device 108, 112 resources.

Again, the systems and methods herein allow immediate printing of the print ready job 118 if the user 100 decides to utilize any of the potentially used printers 108, 112. Thus, based on the selected printer 112 being one of the potentially used printers 108 and in response to the instruction to print the original print job 116, the selected printer 112 immediately begins printing a received one of the print-ready print jobs 118, without any RIPping or transmission delay. After successful printing of the print-ready job, the print server 102 causes the selected printer 112 and the other potentially used printers 108 to delete the print-ready job that was successfully printed, to free up memory resources in the selected and potentially used printers 108, 112.

Of course, the user 100 may decide to print the original print job 116 on one of the other printing devices 110 that have not received one of the print-ready print jobs 118.

Therefore, in contrast to the above, based on the selected printer 112 not being one of the potentially used printers 108, a number of processes take place.

Specifically, in response to the instruction to print the original print job 116, if the selected printer (e.g., one of the other printing devices 110) is not one of the potentially used printers 108, 112 and, therefore, has not previously received a print-ready print job 118 from the print server 102, the selected printer 112 is adapted to send a request to the print server 102 through the network 120 to convert the original print job 116 into a selected-printer specific print-ready print job. The selected-printer specific print-ready print job is in a RIPped printing format specific to the other printing device 110 that is selected.

In response to the request to convert the original print job 116, the print server 102 is adapted to convert (RIP) the original print job 116 into the selected-printer specific print-ready print job. Then, the print server 102 is adapted to send the selected-printer specific print-ready print job to the selected printer 112 through the network 120. In response to the selected-printer specific print-ready print job being received from the print server 102, the selected printer 112 is adapted to print the selected-printer specific print-ready print job. Note that providing the print-ready job 118 before the user 100 selects one of the potentially used printers 108, 112 avoids the pre-printing processing delay described above (RIPping, transmission, etc.) that occurs if one of the other printing devices 110 is selected for printing.

Figure 2:
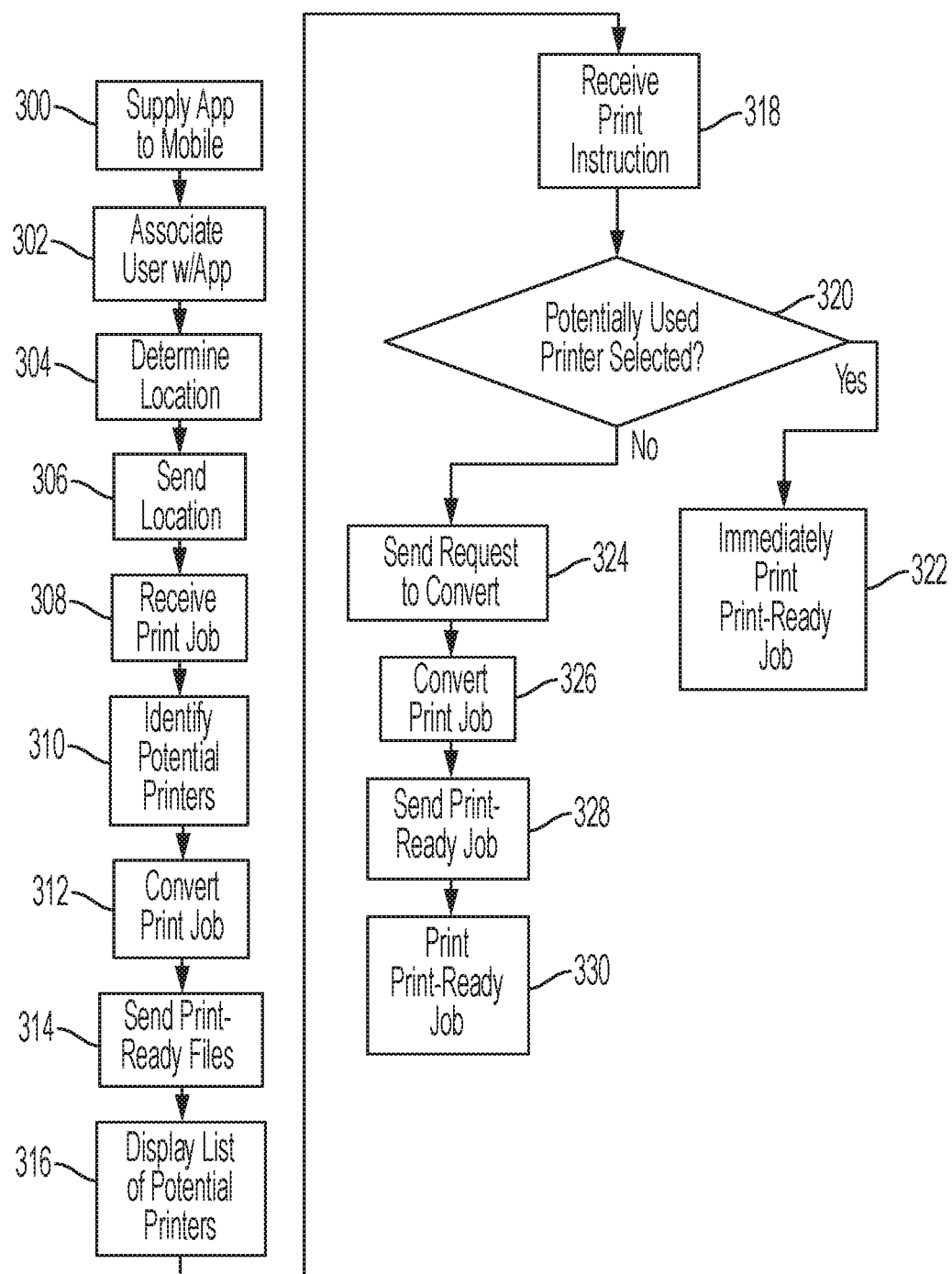
FIG. 2 is a flow diagram of various methods herein.

FIG. 2 is flowchart illustrating exemplary methods herein. In item 300, these methods automatically supply an application from the print server to the mobile wireless device through the network. Also, in item 302, these methods automatically associate (using the application) a user with the application. Further, in item 304 methods herein automatically determine (using the application) the current physical location of the mobile wireless device. Again, multiple printing devices are at different physical locations and are in communication with the print server through the network. In item 306, these methods automatically send (using the application through the network) the current physical location of the mobile wireless device to the print server.

Methods herein automatically receive (using the print server through the network) an original print job that is associated with the user in an originated format in item 308. In item 310, these methods then automatically identify (using the print server) potentially used printers (from the multiple printing devices that are capability screened and can be utilized to print the original print job) based on the current physical location of the mobile wireless device and the different physical locations of the multiple printing devices. The identifying of the potentially used printers in item 310 can be further based on historical printer selections performed by the user.

Such methods automatically convert (using the print server in item 312) the original print job from the originated format into printing formats used by the potentially used printers to generate print-ready print jobs, each corresponding to one of the potentially used printers. The potentially used printers are only able to print using files in the printing formats and are not able to print using files in the originated format. These methods automatically send (using the print server through the network in item 314) the print-ready print jobs to (all of) the potentially used printers when the print-ready print jobs are created (potentially simultaneously) to cause the potentially used printers to store the print-ready print jobs.

In some implementations herein once the print-ready jobs have been downloaded to the potentially used printers, as shown in item 316 the print server could cause the application to display one or more messages to the user on the user interface of the mobile wireless device listing the potentially used printers to which the print-ready print jobs have been downloaded (e.g., "the closest nearby printers are . . . "). The message(s) in item 316 can be displayed, for example, as soon as the print-ready jobs have downloaded, periodically, and/or when the user begins interacting with the item to be printed, when the print driver is utilized by the user, etc.

At some point after the print server sends the print-ready print jobs to the potentially used printers in item 314, these methods receive (using a selected printer of the multiple printing devices) an instruction to print the original print job in item 318. In other words, the sending of the print-ready print jobs to the potentially used printers in item 314 is performed before the instruction to print the original print job is received by the selected printer in item 318. In item 318, the application can be adapted to automatically send the instruction to the selected printer to print the original print job based on user input to the application that indicates that the selected printer is to print the original print job.

As shown in item 320, different processing occurs based on whether the user selects one of the potentially used printers for printing or selects one of the other printing devices. Based on the selected printer being one of the potentially used printers in item 320, as shown in item 322, these methods automatically print (using the selected printer) a received one of the print-ready print jobs when the selected printer receives the instruction to print the original print job. Also, in item 322, after successful printing of the print-ready job, the print server causes the selected and other potentially used printers to delete the corresponding print-ready job they maintain, to free up memory resources.

Alternatively, based on the selected printer not being one of the potentially used printers in item 320, in item 324 these methods automatically send (using the selected printer through the network) a request to the print server to convert the original print job into a selected-printer specific print-ready print job. In response, in item 326 the methods herein automatically convert (using the print server) the original print job into the selected-printer specific print-ready print job. Such methods automatically send (using the print server through the network in item 328) the selected-printer specific print-ready print job to the selected printer. In response, these methods automatically print (using the selected printer in item 330) the selected-printer specific print-ready print job when the selected-printer specific print-ready print job is received from the print server.

As noted above, the print server is adapted to create (312) and send (314) the print-ready print jobs to the potentially used printers through the network before the selected printer receives this instruction to print the original print job (318) and without seeking approval from the user. Therefore, the identification of the potentially used printers 310, the creation and transmission of the print-ready jobs 312, the sending/storage of the print-ready jobs within the potentially used printers 314, etc., is all performed automatically behind the scenes in a transparent manner to the user (e.g., without requesting information from the user and without providing any notification to the user) as soon as the original print job is uploaded to the print server 308. This allows the print ready jobs to be stored and waiting at many different printers to allow immediate printing of the print ready job if the user were to decide to utilize any of the potentially used printers 320. This processing intentionally places a greater value on avoiding delay of pre-printing processing at the printing device, and a lesser value on consumption processing resources of the print server, network resources, and printing device resources.

Figure 3:
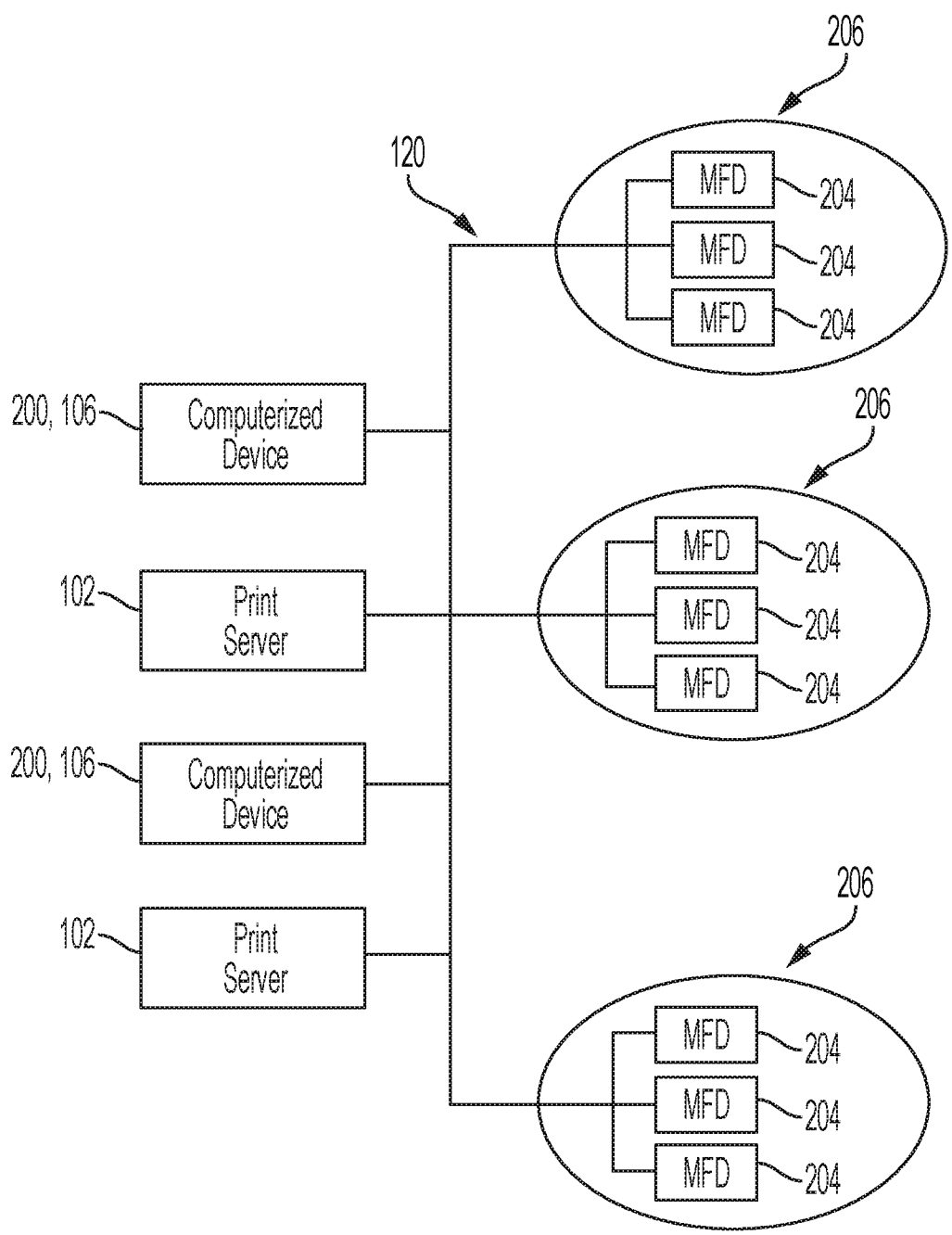
FIG. 3 is a schematic diagram illustrating systems herein.

As shown in FIG. 3, exemplary systems and methods herein include various computerized devices 102, 106, 200, 204 located at various different physical locations 206. The computerized devices 102, 106, 200, 204 can include print servers, printing devices, personal computers, etc., and are in communication (operatively connected to one another) by way of a local or wide area (wired or wireless) network 120.

Figure 4:
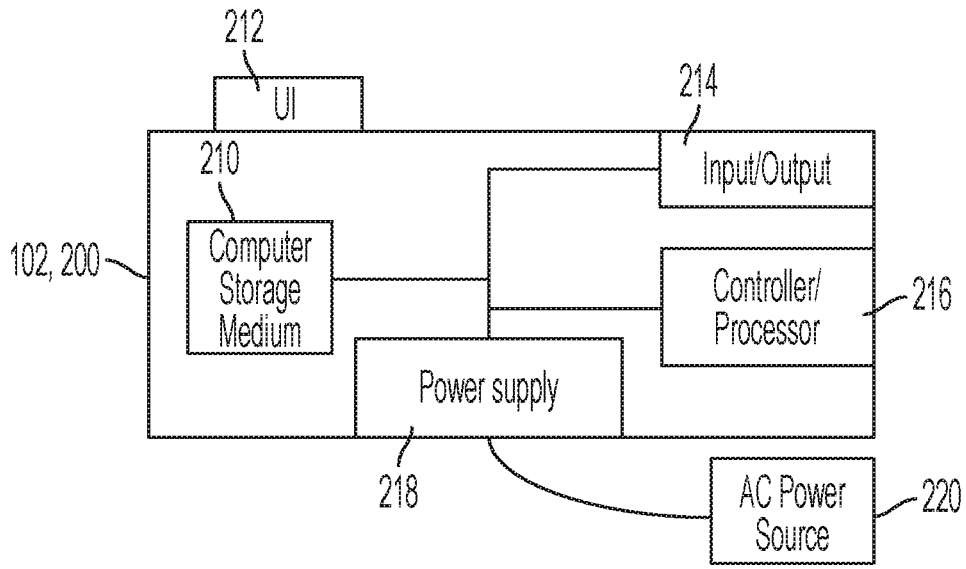
FIG. 4 is a schematic diagram illustrating devices herein.

FIG. 4 illustrates a computerized device 102, 106, 200, which can be used with systems and methods herein and can comprise, for example, a print server, a personal computer, a portable computing device, etc. The computerized device 102, 106, 200 includes a controller/tangible processor 216 and a communications port (input/output) 214 operatively connected to the tangible processor 216 and to the computerized network 120 external to the computerized device 102, 106, 200. Also, the computerized device 102, 106, 200 can include at least one accessory functional component, such as a user interface (UI) assembly 212. The user may receive messages, instructions, and menu options from, and enter instructions through, the user interface or control panel 212.

The input/output device 214 is used for communications to and from the computerized device 102, 106, 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 4, a body housing has one or more functional components that operate on power supplied from an alternating current (AC) source 220 by the power supply 218. The power supply 218 can comprise a common power conversion unit, power storage element (e.g., a battery, etc.), etc.

Figure 5:
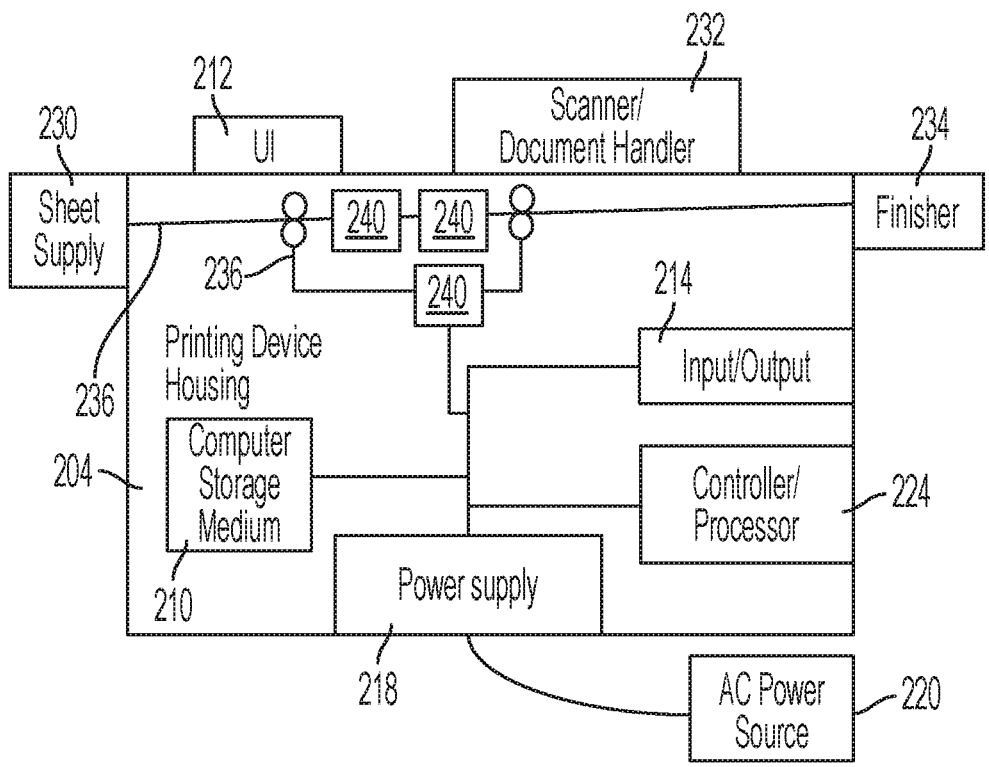
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Therefore, the print server 102 has a processor 216 and an input/output device 214, electronic storage 210, etc., in communication with the processor 216. The print server 102 is adapted to supply an application to a mobile wireless device 106 through the network 120. The application is adapted to associate a user with the application. The application is also adapted to determine and provide a current physical location of the mobile wireless device 106 to the print server 102 through the network 120. There are multiple printing devices 204 at different physical (e.g., geographic) locations 206 that are in communication with the print server 102 through the network 120.

The print server 102 is adapted to receive an original print job that is associated with the user in an originated format through the network 120. In response to receiving the original print job, the print server 102 is adapted to identify potentially used printers (from among the multiple printing devices 204) that can be utilized to print the original print job based on the current physical location of the mobile wireless device 106 and based on the different physical locations 206 of the multiple printing devices 204. The print server 102 can also be adapted to identify the potentially used printers further based on historical printer selections performed by the user.

In further response to receiving the original print job, the print server 102 is adapted to convert the original print job from the originated format into printing formats used by the potentially used printers so as to generate multiple print-ready print jobs, each corresponding to one of the potentially used printers. The potentially used printers are only able to print using files in the printing formats and are not able to print using files in the originated format. The print server 102 is also adapted to send these print-ready print jobs to the potentially used printers (e.g., all the potentially used printers) through the network 120 immediately when the print-ready print jobs are created.

At some time after the potentially used printers have received their print-ready print jobs, a selected printer (which can be any one of the multiple printing devices 204) is adapted to receive an instruction to print the original print job. Note that the print server 102 is adapted to send the print-ready print jobs to the potentially used printers through the network 120 before the selected printer receives the instruction to print the original print job. Also, in some implementations, the application is adapted to send the instruction to the selected printer to print the original print job based on user input to the application indicating the selected printer is to print the original print job. If the selected printer is one of the potentially used printers and in response to the instruction to print the original print job, the selected printer prints a received one of the print-ready print jobs.

In contrast, if the selected printer is not one of the potentially used printers, a number of processes take place. Specifically, in response to the instruction to print the original print job, if the selected printer is not one of the potentially used printers and, therefore, has not previously received a print-ready print job from the print server 102, the selected printer is adapted to send a request to the print server 102 through the network 120 to convert the original print job into a selected-printer specific print-ready print job. The selected-printer specific print-ready print job has one of the printing formats. In response to this request to convert the original print job, the print server 102 is adapted to convert the original print job into the selected-printer specific print-ready print job. Then, the print server 102 is adapted to send the selected-printer specific print-ready print job to the selected printer through the network 120. In response to the selected-printer specific print-ready print job being received from the print server 102, the selected printer is adapted to print the selected-printer specific print-ready print job.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
a print server connected to a network,
wherein the print server comprises a processor and an input/output device in communication with the processor,
wherein the print server is adapted to receive an original print job in an originated format that is associated with a user through the network,
wherein the print server is adapted to identify potentially used printers that can be utilized to print the original print job based on a current physical location of a mobile wireless device associated with the user,
wherein the print server is adapted to convert the original print job from the originated format into printing formats used by the potentially used printers to generate print-ready print jobs,
wherein the print server is adapted to send the print-ready print jobs to the potentially used printers through the network using the input/output device when the print-ready print jobs are created,
wherein a selected printer of the potentially used is adapted to receive an instruction to print the original print job, and
wherein the selected printer prints a received one of the print-ready print jobs when the selected printer receives the instruction to print the original print job.

2. The system according to claim 1, wherein the print server is adapted to identify the potentially used printers further based on historical printer selections performed by the user.

3. The system according to claim 1, wherein the print server is adapted to send the print-ready print jobs to the potentially used printers through the network before the selected printer receives the instruction to print the original print job.

4. The system according to claim 1, wherein the print server is adapted to send the print-ready print jobs to all the potentially used printers.

5. The system according to claim 1, wherein the mobile wireless device is adapted to send the instruction to the selected printer to print the original print job based on user input to the mobile wireless device indicating the selected printer is to print the original print job.

6. The system according to claim 1, wherein the potentially used printers are only able to print using files in the printing formats and are not able to print using files in the originated format.

7. The system according to claim 1, wherein the mobile wireless device communicates with the print server and the selected printer through an application operating on the mobile wireless device.

8. A system comprising:
a print server connected to a network,
wherein the print server comprises a processor and an input/output device in communication with the processor,
wherein the print server is adapted to supply an application to a mobile wireless device through the network,
wherein the application is adapted to associate a user with the application, wherein the application is adapted to determine and send a current physical location of the mobile wireless device to the print server through the network, wherein multiple printing devices at different physical locations are in communication with the print server through the network, wherein the print server is adapted to receive an original print job that is associated with the user in an originated format through the network, wherein, in response to receiving the original print job, the print server is adapted to identify potentially used printers of the multiple printing devices that can be utilized to print the original print job based on the current physical location of the mobile wireless device and based on the different physical locations of the multiple printing devices, wherein, in response to receiving the original print job, the print server is adapted to convert the original print job from the originated format into printing formats used by the potentially used printers to generate multiple print-ready print jobs, each corresponding to one of the potentially used printers, wherein the print server is adapted to send the print-ready print jobs to the potentially used printers through the network using the input/output device when the print-ready print jobs are created, wherein a selected printer of the multiple printing devices is adapted to receive an instruction to print the original print job, wherein, based on the selected printer being one of the potentially used printers and in response to the instruction to print the original print job, the selected printer prints a received one of the print-ready print jobs, and wherein, based on the selected printer not being one of the potentially used printers:

the selected printer is adapted to send a request to the print server through the network to convert the original print job into a selected-printer specific print-ready print job in response to the instruction to print the original print job;

the print server is adapted to convert the original print job into the selected-printer specific print-ready print job in response to the request to convert the original print job;

the print server is adapted to send the selected-printer specific print-ready print job to the selected printer through the network; and the selected printer is adapted to print the selected-printer specific print-ready print job in response to the selected-printer specific print-ready print job being received from the print server.

9. The system according to claim 8, wherein the print server is adapted to identify the potentially used printers further based on historical printer selections performed by the user.

10. The system according to claim 8, wherein the print server is adapted to send the print-ready print jobs to the potentially used printers through the network before the selected printer receives the instruction to print the original print job.

11. The system according to claim 8, wherein the print server is adapted to send the print-ready print jobs to all the potentially used printers.

12. The system according to claim 8, wherein the application is adapted to send the instruction to the selected printer to print the original print job based on user input to the application indicating the selected printer is to print the original print job.

13. The system according to claim 8, wherein the potentially used printers are only able to print using files in the printing formats and are not able to print using files in the originated format.

14. The system according to claim 8, wherein the selected-printer specific print-ready print job has one of the printing formats.

15. A method comprising:

supplying an application from a print server to a mobile wireless device through a network;

associating, by the application, a user with the application;

determining, by the application, a current physical location of the mobile wireless device, wherein multiple printing devices at different physical locations are in communication with the print server through the network;

sending, by the application through the network, the current physical location of the mobile wireless device to the print server;

receiving, by the print server through the network, an original print job that is associated with the user in an originated format;

identifying, by the print server, potentially used printers of the multiple printing devices that can be utilized to print the original print job based on the current physical location of the mobile wireless device and the different physical locations of the multiple printing devices;

converting, by a processor of the print server, the original print job from the originated format into printing formats used by the potentially used printers to generate print-ready print jobs, each corresponding to one of the potentially used printers;

sending, by an input/output device of the print server through the network, the print-ready print jobs to the potentially used printers when the print-ready print jobs are created, receiving, by a selected printer of the multiple printing devices, an instruction to print the original print job;

based on the selected printer being one of the potentially used printers, printing, by the selected printer, a received one of the print-ready print jobs when the selected printer receives the instruction to print the original print job; and based on the selected printer not being one of the potentially used printers:

sending, by the selected printer through the network, a request to the input/output device of the print server to convert the original print job into a selected-printer specific print-ready print job;

converting, by the processor of the print server, the original print job into the selected-printer specific print-ready print job;

sending, by the input/output device of the print server through the network, the selected-printer specific print-ready print job to the selected printer; and printing, by the selected printer, the selected-printer specific print-ready print job when the selected-printer specific print-ready print job is received from the print server.

16. The method according to claim 15, wherein the identifying of the potentially used printers is further based on historical printer selections performed by the user.

17. The method according to claim 15, wherein the sending of the print-ready print jobs to the potentially used printers is performed before the instruction to print the original print job is received by the selected printer.

18. The method according to claim 15, wherein the sending of the print-ready print jobs to the potentially used printers is performed by sending the print-ready print jobs to all the potentially used printers.

19. The method according to claim 15, wherein the application is adapted to send the instruction to the selected printer to print the original print job based on user input to the application indicating the selected printer is to print the original print job.

20. The method according to claim 15, wherein the potentially used printers are only able to print using files in the printing formats and are not able to print using files in the originated format.

\* \* \* \* \*